United States Patent
Galan

(10) Patent No.: US 10,361,798 B1
(45) Date of Patent: Jul. 23, 2019

(54) RADIOFREQUENCY COMPONENT PERFORMANCE MEASUREMENT USING RADIATED SPURIOUS ENERGY

(71) Applicant: MOTOROLA SOLUTIONS, INC., Chicago, IL (US)

(72) Inventor: Ariel L. Galan, Ft. Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/972,871

(22) Filed: May 7, 2018

(51) Int. Cl.
| | |
|---|---|
| *H04B 17/15* | (2015.01) |
| *H04B 17/318* | (2015.01) |
| *H04B 1/40* | (2015.01) |
| *G08B 21/18* | (2006.01) |
| *H04B 17/29* | (2015.01) |
| *H04B 17/19* | (2015.01) |

(52) U.S. Cl.
CPC ......... *H04B 17/318* (2015.01); *G08B 21/182* (2013.01); *H04B 1/40* (2013.01); *H04B 17/19* (2015.01); *H04B 17/29* (2015.01)

(58) Field of Classification Search
CPC ........ H04B 17/15; H04B 17/17; H04B 17/19; H04B 17/20; H04B 17/26; H04B 17/27; H04B 17/29; H04B 17/30; H04B 17/309; H04B 17/318; H04B 1/40; G08B 21/18; G08B 21/182; G08B 21/185; G08B 21/187

See application file for complete search history.

(56) References Cited

U.S. PATENT DOCUMENTS

| | | | | |
|---|---|---|---|---|
| 5,361,402 | A * | 11/1994 | Grube ................. | H04B 17/309 455/423 |
| 6,114,955 | A * | 9/2000 | Brunius ................. | H04B 17/20 340/286.02 |
| 6,253,067 | B1 * | 6/2001 | Tsuji ..................... | H04B 17/19 455/115.2 |
| 7,084,808 | B2 | 8/2006 | Ratzel et al. | |
| 8,723,531 | B2 | 5/2014 | Harrison | |
| 8,902,111 | B2 | 12/2014 | Liu | |
| 9,830,816 | B1 * | 11/2017 | Murray ............ | G08G 1/096791 |

(Continued)

*Primary Examiner* — Siu M Lee
(74) *Attorney, Agent, or Firm* — Michael Best & Friedrich LLP

(57) ABSTRACT

Systems and methods for radiofrequency component performance measurement using radiated spurious energy. One example embodiment provides a portable communication device. The device includes a transceiver, a digital signal processor coupled to the transceiver, and an electronic processor coupled to the transceiver and the digital signal processor. The electronic processor is configured to tune the transceiver from an operating channel to a self-quieting channel. The electronic processor is configured to receive, from the digital signal processor, a received signal strength indication based a self-quieting signal received via the transceiver. The electronic processor is configured to compare the received signal strength indication for the self-quieting signal to a predetermined reference signal strength indication associated with the self-quieting channel to determine a signal strength difference. The electronic processor is configured to, when the signal strength difference exceeds a threshold, generate a component failure alert based on the signal strength difference.

23 Claims, 4 Drawing Sheets

(56) References Cited

U.S. PATENT DOCUMENTS

2004/0127161 A1\* 7/2004 Leizerovich ....... H04B 17/0085
                                                    455/67.11
2006/0197538 A1   9/2006 Leinonen et al.
2015/0023400 A1\* 1/2015 Das ...................... H04B 7/0404
                                                    375/224

\* cited by examiner

| APX7000 | | | | |
|---|---|---|---|---|
| RSSI READINGS USING RADIODEBUGGER COMMAND ATT : RSSI | | | | |
| SELF QUIETER 149.325 MHZ | | | | |
| TERMINATION | ANTENNA | ANTENNA | DAMAGED ANTENNA 1 | DAMAGED ANTENNA 2 |
| 50 OHMS | OFF | REFERENCE | E28FF2 | LT24CPT |
| 4FB3 | 518E | 35F2 | 48D3 | 4263 |
| 5087 | 5286 | 3736 | 4AAF | 425A |
| 4EB1 | 4EB1 | 3654 | 4946 | 4175 |
| 4F84 | 51DB | 3781 | 4AEE | 409D |
| 4F2B | 5018 | 38A2 | 4E8C | 43DA |
| 4ED8 | 4FE4 | 3652 | 4B0E | 4346 |
| 4F01 | 5018 | 35F4 | 4C98 | 40F2 |
| 5103 | 54DE | 366F | 4C28 | 41BC |
| 4E8C | 51DB | 359A | 4CB0 | 44CC |
| 4D85 | 518E | 35DB | 4AFE | 452F |

RADIOFREQUENCY COMPONENT PERFORMANCE MEASUREMENT USING RADIATED SPURIOUS ENERGY

BACKGROUND OF THE INVENTION

Public safety personnel (for example, police, fire fighters, first responders, investigators, and the like) use portable communication devices to communicate with one another during the performance of their duties. The use of communication devices in hazardous environments or under stressful conditions may damage some components of the devices, for example, the external antennas. Damaged components may degrade or interrupt communications between public safety personnel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a chart illustrating measurements of radiofrequency component performance made using radiated spurious energy, in accordance with some embodiments.

Figure 1:
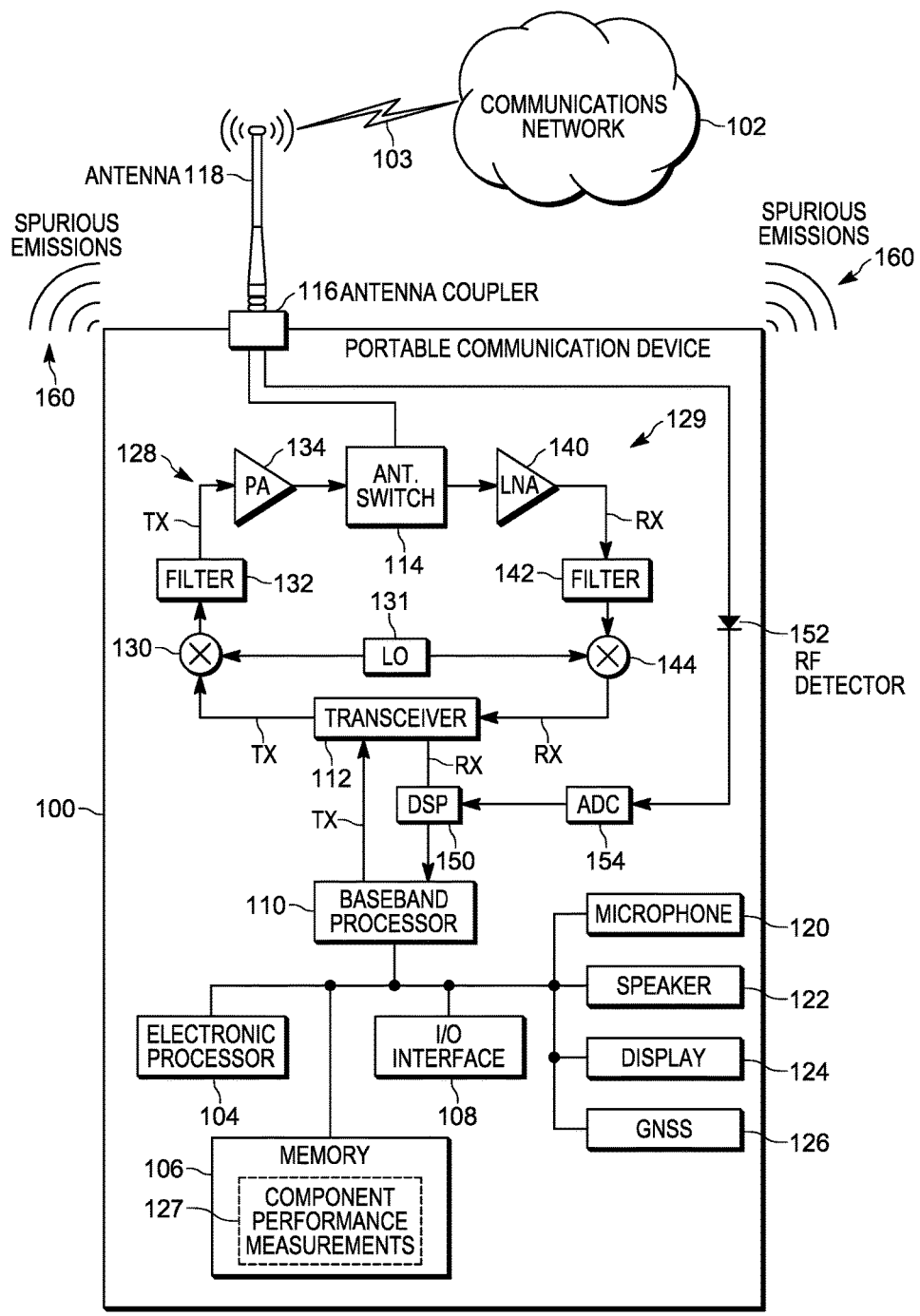
FIG. 1 is a diagram of a portable communication device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, public safety personnel use portable communications devices to communicate. A portable communication device is subject to wear, water, and contaminants from the environment (for example, water, dirt, physical shock and contact during an outdoor foot chase), which may result in damage to some of the device's components. For example, an external antenna may be bent or an internal electrical component may be damaged by a physical shock or extreme temperature. In some instances, incorrect components may be installed on a portable communication device. For example, an antenna configured for one frequency band may be installed on a radio configured for a different frequency band. In other instances, the correct component may be installed incorrectly. For example, the correct antenna for a radio may not be screwed on tightly enough, or may be cross-threaded onto the connector, resulting in an incomplete or intermittent electrical connection.

When a portable communication device's components, are damaged, incorrectly installed, or mismatch to other components of the system, degraded radio communications may result. However, such situations may not be apparent upon visual inspection of the portable communication device. As a consequence, a user may not discover the impaired performance of the portable communication device until he or she attempts to communicate with it.

Currently, damaged, incorrectly installed, or mismatched components may be discovered by physical inspection or testing. For example, an antenna may be removed from the radio and tested, for example, using an antenna analyzer. In another example, internal components of the portable communication device may be tested with a meter or other test equipment. However, such testing is intrusive and takes the portable communication device out of service. Furthermore, such testing is cumbersome, and not cost-effective to perform frequently. Component failure may occur between physical testing, and be discovered only when a user attempts to communicate with the portable communication device while in service. To address this, some portable communication devices incorporate additional hardware to measure the voltage standing wave ratio (VSWR) for the device. However, such measurement techniques only work when the radio is in transmit mode. Thus, a failure may still go undetected until a device is used to transmit in the field. In addition, such techniques are prone to false positives, for example, when external energy from a nearby transmitter of another device is coupled to the antenna coupler. While operating, a portable communication device emits spurious radiofrequency signals. Such emissions may be of sufficient strength that they escape radiate out of the portable communication device, and are coupled to the external antenna. Accordingly, embodiments presented herein provide, among other things, systems and methods for radiofrequency component performance measurement using radiated spurious energy.

Embodiments presented herein measure the received signal strength of the portable communication device's own spurious emissions to measure the performance of the antenna and other components. Using such embodiments, no additional hardware is needed to measure component performance, and component performance may be measured while the device is idle. This allows the portable communications device to regularly perform checks on its antenna and other components, and alert a user when it discovers a fault. This reduces the likelihood that the user will discover the fault by attempting to use the device. Furthermore, because no additional hardware is required with the device's own spurious emissions to measure the performance of the antenna and other components, it is possible to retrofit or field upgrade existing radio software to control the spurious emissions measurements as described in the subsequent embodiments to determine device component or antenna performance. In addition, performance metrics determined from the measurement of the self-generated spurious energy can be queried remotely by network-attached probing devices (for example, a server or other electronic device) that execute radio device health management applications. Such applications can track the communications status of devices operating in the field and alert other users and systems when communications may be compromised. In addition, because such embodiments are not limited to detecting VSWR at the antenna port coupler, they can be used to detect faults in other radio components. Furthermore, embodiments may be used to check against false positives in devices equipped with hardware detection.

One example embodiment provides a portable communication device. The device includes a transceiver, a digital signal processor coupled to the transceiver, and an electronic processor coupled to the transceiver and the digital signal processor. The electronic processor is configured to tune the transceiver from an operating channel to a self-quieting channel. The electronic processor is configured to receive, from the digital signal processor, a received signal strength indication based a self-quieting signal received via the transceiver. The electronic processor is configured to compare the received signal strength indication for the self-quieting signal to a predetermined reference signal strength indication associated with the self-quieting channel to determine a signal strength difference. The electronic processor is configured to, when the signal strength difference exceeds a threshold, generate a component failure alert based on the signal strength difference.

Another example embodiment provides a method for radiofrequency component performance measurement using radiated spurious energy. The method includes tuning a transceiver from an operating channel to a self-quieting channel. The method includes receiving, from a digital signal processor, a received signal strength indication based a self-quieting signal received via the transceiver. The method includes comparing, with an electronic processor, the received signal strength indication for the self-quieting signal to a predetermined reference signal strength indication associated with the self-quieting channel to determine a signal strength difference. The method includes generating a component failure alert based on the signal strength difference when the signal strength difference exceeds a threshold.

Another example embodiment provides a system for measuring performance of an antenna using radiated spurious energy. The system includes a transceiver, a digital signal processor coupled to the transceiver, and an electronic processor coupled to the transceiver and the digital signal processor. The electronic processor is configured to tune the transceiver from an operating channel to a self-quieting channel. The electronic processor is configured to receive, from the digital signal processor, a received signal strength indication based a self-quieting signal received via the transceiver. The electronic processor is configured to compare the received signal strength indication for the self-quieting signal to a predetermined reference signal strength indication associated with the self-quieting channel to determine a signal strength difference. The electronic processor is configured to, when the signal strength difference exceeds a threshold, generate an antenna failure alert based on the signal strength difference.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of an example portable communication device 100. As described more particularly below, the portable communication device 100 transmits and receives voice, data, or combinations of both to other communication devices (not shown) using radiofrequency signals (for example, the radiofrequency link 103). The portable communication device 100 communicates directly with other devices, indirectly via a communications network 102, or using combinations of both. In some embodiments, the portable communication device 100 is a handheld communication device, for example, a portable two-way radio, or a converged device including electronics, software, and other components sufficient to support both cellular and land mobile radio communications. In alternative embodiments, the portable communication device 100 may be any type of communication device including components and functionality as described herein.

In the embodiment illustrated, the portable communication device 100 includes an electronic processor 104, a memory 106, an input/output interface 108, a baseband processor 110, a transceiver 112, an antenna switch 114, an antenna coupler 116, an antenna 118, a microphone 120, a loudspeaker 122, a display 124, and a global navigation satellite system 126. The illustrated components, along with other various modules and components are coupled to each other by or through one or more electrical connections (for example, control or data buses) that enable communication therebetween. The use of such connections, including control and data buses, for the interconnection between and exchange of information among the various modules and components would be apparent to a person skilled in the art. In some embodiments, the portable communication device 100 includes fewer or additional components in configurations different from that illustrated in FIG. 1.

The electronic processor 104 obtains and provides information (for example, from the memory 106 and/or the input/output interface 108), and processes the information by executing one or more software instructions or modules, capable of being stored, for example, in a random access memory ("RAM") area of the memory 106 or a read only memory ("ROM") of the memory 106 or another non-transitory computer readable medium (not shown). The software can include firmware, one or more applications, program data, filters, rules, one or more program modules, and other executable instructions. The electronic processor 104 is configured to retrieve from the memory 106 and execute, among other things, software related to the control processes and methods described herein. The memory 106 can include one or more non-transitory computer-readable media, and includes a program storage area and a data storage area. The program storage area and the data storage area can include combinations of different types of memory, as described herein. In the embodiment illustrated, the memory 106 stores, among other things, component performance measurements 127, made according to the methods described herein.

The input/output interface 108 receives input from, for example, a user input device of the portable communication device 100, provides system output, or a combination of both. The input/output interface 108 obtains information and signals from, and provides information and signals to, (for example, over one or more wired and/or wireless connections) devices both internal and external to the portable communication device 100. Output may be provided via the loudspeaker 122 and the display 124. The loudspeaker 122 is a transducer for reproducing sound from electrical signals (for example, generated from a received audio stream) received from the electronic processor 104. The display 124 is a suitable display, for example, a liquid crystal display (LCD) touch screen, or an organic light-emitting diode (OLED) touch screen. Alternative embodiments may include other output mechanisms such as, for example, haptic feedback motors and light sources (not shown). Input may be provided via, for example, a keypad, a microphone, soft keys, icons, or soft buttons on the display 124, a scroll ball, buttons, and the like. The input/output interface 108 may include a graphical user interface (GUI) (for example, generated by the electronic processor 104, from instructions and data stored in the memory 106, and presented on the display 124) that enables a user to interact with the portable communication device 100.

The electronic processor 104 is configured to control the baseband processor 110 and the transceiver 112 to transmit and receive voice and other data to and from the portable communication device 100. The baseband processor 110 encodes and decodes digital data sent and received by the transceiver 112. The transceiver 112 transmits and receives radiofrequency signals to and from, for example, the network 102 using the antenna 118. The electronic processor 104, the baseband processor 110, and the transceiver 112 may include various digital and analog components, which for brevity are not described herein and which may be implemented in hardware, software, or a combination of both. Some embodiments include separate transmitting and receiving components, for example, a transmitter and a receiver, instead of a combined transceiver 112.

The antenna 118 is coupled to the transceiver 112 via the antenna coupler 116 (for example, a Sub Miniature version A ("SMA") coaxial connector), the antenna switch 114, a transmit path 128, and a receive path 129. The antenna switch 114 is an electronic switch that automatically connects the antenna 118 to the transmit path 128 when the transceiver 112 is transmitting, and to the receive path 129 when the transceiver 112 is not transmitting.

The transmit path 128 includes a transmit mixer 130, a local oscillator 131, a transmit filter 132 (for example, a bandpass filter), and a power amplifier 134. The transmit mixer 130 mixes signals from the transceiver 112 with signals from the local oscillator 131 to produce signals for transmission, which are filtered by the transmit filter 132, and amplified by the power amplifier 134 to drive the antenna 118.

The receive path 129 (also known as a receiver front end) includes a low noise amplifier 140, a receive filter 142 (for example, a bandpass filter), and a receive mixer 144. The low noise amplifier 140 receives radio signals from the antenna 118, boosts the signals, and passes them to the receive filter 142, which passes the filtered signals to the receive mixer 144. The receive mixer 144 mixes the filtered signals with signals from the local oscillator 131 to produce signals, which are passed to the transceiver 112 and the baseband processor 110 for decoding. In some embodiments, the transmit path 128 and the receive path 129 each has a dedicated local oscillator. In some embodiments, the receive path 129 includes an Intermediate Frequency amplifier (not shown).

Signals received from the transceiver 112 are processed by a digital signal processor 150 as they are passed to the baseband processor for decoding. As described in detail below, the digital signal processor 150 is capable of taking received signal strength indicator (RSSI) measurements of the incoming signals. The digital signal processor 150 is also capable of measuring the reflected power at the antenna coupler 116 while the transceiver 112 is transmitting. The reflected power is received by a radiofrequency detector 152, converted to a digital signal by the analog to digital converter 154, and processed by the digital signal processor 150 to measure the voltage standing wave ratio for the antenna 118.

The microphone 120 is a transducer capable of sensing sound, converting the sound to electrical signals, and transmitting the electrical signals to the electronic processor 104. The electronic processor 104 processes the electrical signals received from the microphone 120 to produce an audio stream, which may be transmitted to other devices via the transceiver 112.

The global navigation satellite system (GNSS) 126 receives radiofrequency signals from orbiting satellites using one or more antennas and receivers (not shown). The global navigation satellite system 126 determines geo-spatial positioning (that is, latitude, longitude, altitude, and speed) for the portable communication device 100 based on the received radiofrequency signals. Global navigation satellite systems are known, and will not be described in greater detail. In some embodiments, the global navigation satellite system 126 operates using the global positioning system (GPS). Alternative embodiments may use a regional satellite navigation system, and/or a land-based navigation system in conjunction with, or in place of, the global navigation satellite system 126.

As noted, the portable communication device 100 operates to emit radiofrequency signals (for example, the radiofrequency link 103). Such signals are emitted at a particular channel within a particular frequency band, and at a determined power level. However, the operation of the portable communication device 100 also results in radiated spurious energy (for example, the spurious emissions 160), which are not deliberately created. Spurious energy includes discrete harmonics of clock signals, broadband noise energy (for example, switching regulators), receiver thermal noise, switching regulator rate signals, and the like. For example, reference clock signals used by the local oscillator 131, the display 124, components of the input/output interface 108, the electronic processor 104, the baseband processor 110, and the like may radiate energy out of the portable communication device 100. Radiated spurious energy of sufficient strength (for example, 20 dB above sensitivity) is known as a self-quieting signal because the signal is of sufficient strength to be heard by the receive path 129, and it quiets all the background noise. The self-quieting frequencies for a particular communication device are determined during design and testing of the device. The communication device is ordinarily configured to avoid tuning to those frequencies. However, as set forth below, when the transceiver 112 is deliberately tuned to a known self-quieting frequency, the radiated spurious energy received may be used as a test signal to assess the performance of the antenna 118 and other components of the portable communication device 100.

Figure 2:
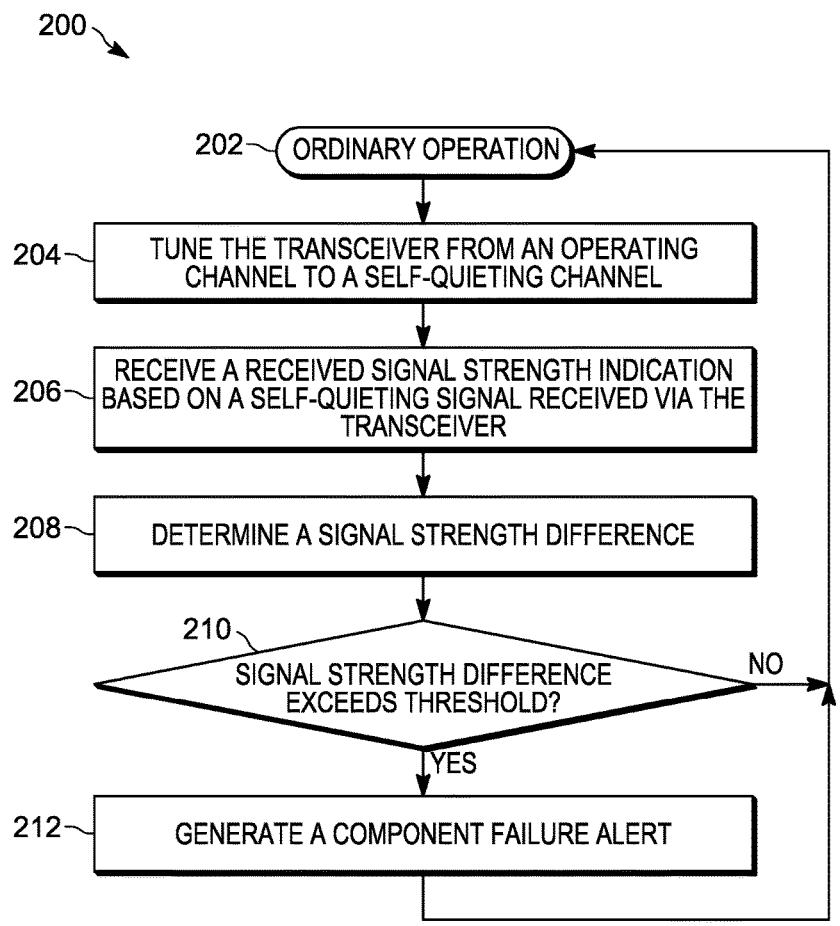
FIG. 2 is a flowchart illustrating a method for antenna performance measurement using radiated spurious energy, in accordance with some embodiments.

FIG. 2 illustrates an example method 200 for measuring antenna performance using radiated spurious energy. The method 200 is described as being performed by the portable communication device 100 and, in particular, the electronic processor 104. As an example, the method 200 is described in terms of measuring the performance of the antenna 118.

At block 202, the portable communication device 100 is in ordinary operation (that is, tuned to a particular channel for communication with other devices).

At block 204, the electronic processor 104 tunes the transceiver 112 from an operating channel to a self-quieting frequency. The frequency is chosen from known self-quieting frequencies for the portable communication device 100 based on the characteristics of the signal. The self-quieting signal chosen must be sufficiently strong (for example, 20 dB above receiver sensitivity) and relatively constant. FIG. 4 illustrates a chart 400 for a self-quieting frequency of 149.325 MHz. The antenna reference RSSI values 402

(readings of the self-quieting frequency taken with a known good reference antenna) are expressed in hexadecimal, where each hex step represents a 1 dB increment in RSSI power. As illustrated, the antenna reference values 402 remain relatively constant, varying by about 3 dB.

Returning to FIG. 2, at block 206, the electronic processor 104 receives, from the digital signal processor 150, a received signal strength indication based a self-quieting signal received via the transceiver 112. In some embodiments, a single received signal strength indication is used. In other embodiments, the electronic processor 104 receives a plurality of received signal strength indications for the self-quieting signal. In other embodiments, the electronic processor 104 receives a plurality of received signal strength indications from multiple self-quieting signal frequencies or channels in a redundant system to reduce signal strength indications errors caused by external interference, and other environmental conditions. In such embodiments, the electronic processor 104 calculates an average received signal strength indication for the self-quieting signal or signals based on the plurality of received signal strength indications.

At block 208, the electronic processor 104 compares the received signal strength indication for the self-quieting signal to a predetermined reference signal strength indication associated with the self-quieting channel to determine a signal strength difference. In some embodiments, the predetermined reference signal strength indication is determined by averaging multiple readings for the self-quieting frequency signal or signals in redundant system taken using a known good antenna. In some embodiments, the predetermined reference signal strength indication is determined by calculating the median for multiple readings for the self-quieting frequency taken using a known good antenna.

In embodiments where an average received signal strength indication is calculated, the electronic processor 104 determines the signal strength difference by comparing the average received signal strength indication to the predetermined reference signal strength indication.

At block 210, the electronic processor 104 compares the signal strength difference to a predetermined threshold. The threshold is based on a plurality of predetermined reference signal strength indications for the self-quieting channel (as shown in FIG. 4). For example, the threshold may be a standard deviation (in dB) of the average of the plurality of predetermined reference signal strength indications for the self-quieting channel.

When the signal strength difference does not exceed the threshold, the electronic processor 104 returns to ordinary operation (at block 202).

When the signal strength difference exceeds the threshold, at block 212, the electronic processor 104 generates a component failure alert (for example, an antenna failure alert) based on the signal strength difference. In some embodiments, the component failure alert is a sound generated by the loudspeaker 122, a graphical alert on the display 124, a haptic vibration, an electronic message sent via the input/output interface 108, or combinations of the foregoing.

In some embodiments, when the signal strength difference exceeds the threshold, the electronic processor 104 also determines a failure severity based on the signal strength difference. In some embodiments, the failure severity is a measure of by how many dB the threshold has been exceeded. In such embodiments, the electronic processor 104 generates the component failure alert based further on the determined failure severity. For example, a lower failure severity may be indicative of a loose antenna, while a higher severity may be indicative of a physically damaged (for example, broken or bent) antenna. As a consequence, a lower failure severity may produce a component failure alert warning the user to check the antenna, while a higher failure severity may produce a component failure alert warning the user to replace the antenna.

As noted, some embodiments of the portable communication device 100 may include an RF detector 152 and an A/D converter 154 for measuring the voltage standing wave ratio of the antenna 118. In such embodiments, the method 200 may be used to determine an accuracy rating (for example, a percentage) for the voltage standing wave ratio based on the signal strength difference. For example, when the voltage standing wave ratio is high enough that an antenna failure is suspected, but the signal strength difference does not exceed the threshold, a lower accuracy rating may be determined for the VSWR reading. For example, the accuracy rating may be a percentage based on how much the voltage standing wave ratio differs from a voltage standing wave ratio calculated based on the signal strength difference of a self quieting channel to calculate VSWR derived from loss in transmission energy or mismatch loss through the antenna.

In some embodiments, when the accuracy rating exceeds an error threshold, the electronic processor 104 generates an error condition, which is used to warn a user that the hardware-generated voltage standing wave ratio may not be accurate.

Because voltage standing wave ratio readings can be affected by nearby external transmitters, in some embodiments, the electronic processor 104 tracks the location of the portable communication device 100 when the accuracy rating is determined. In such embodiments, the electronic processor 104 receives, from the global navigation satellite system 126, a location for the portable communication device when the reflected power signal is received. The electronic processor 104 stores (for example, in the memory 106) the accuracy rating, the location, and a time when the reflected power signal was received. This data may be transmitted to or retrieved later by technicians for analysis to determine, for example, where external transmitters or other environmental conditions may be adversely affecting radio communications for the portable communication device 100.

Figure 3:
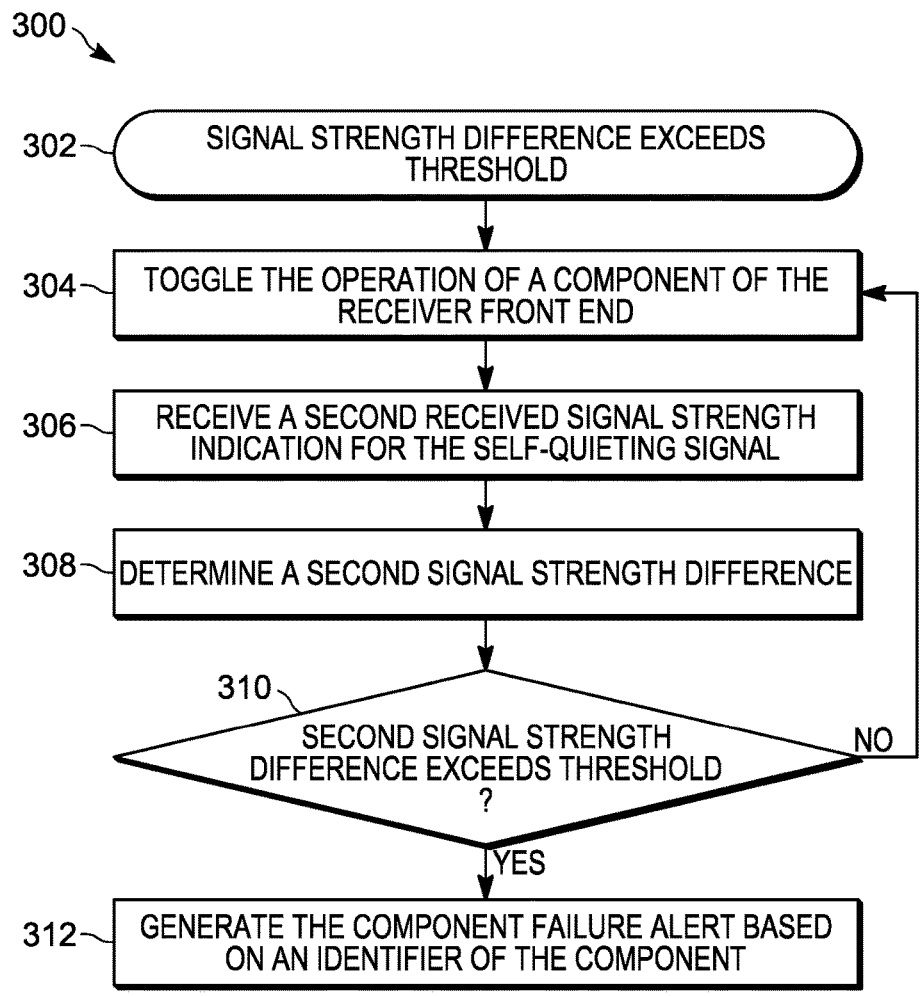
FIG. 3 is a flowchart illustrating a method for radiofrequency component performance measurement using radiated spurious energy, in accordance with some embodiments.

It is possible for components other than the antenna 118, for example, elements of the receive path 129, to fail or degrade. Radiated spurious energy may also be used to measure the performance of these components. Accordingly, FIG. 3 illustrates an example method 300 for radiofrequency component performance measurement using radiated spurious energy. The method 300 is described as being performed by the portable communication device 100 and, in particular, the electronic processor 104. The method 300 begins at block 302, with a determination (for example, made according to the method 200) that the signal strength difference exceeds the threshold.

At block 304, the electronic processor 104 toggles the operation of a component of the receive path 129 (the receiver front end). For example, the electronic processor may deactivate (or bypass) one at a time, either the low noise amplifier 140, the receive mixer 144, the receive filter 142, and the local oscillator 131.

After toggling the component, the electronic processor 104 receives, from the digital signal processor 150, a second received signal strength indication for the self-quieting signal, at block 306.

At block 308, the electronic processor 104 compares the second received signal strength indication for the self-quieting signal to the predetermined reference signal strength indication associated with the self-quieting channel and the particular component being toggled to determine a second signal strength difference. This may be performed, for example, as described above with respect to the first signal strength difference determined by the method 200.

At block 310, the electronic processor 104 compares the second signal strength difference to the threshold. When the second signal strength difference does not exceed the threshold, the electronic processor 104 toggles the operation of a different component, at block 304. In some embodiments, the electronic processor 104 repeats blocks 304-310 with each component to be tested to determine which, if any, of the components is failing.

At block 312, when the second signal strength difference exceeds the threshold, the electronic processor 104 generates the component failure alert based further on an identifier of the component (that is, to particularly indicate which of the components is faulty).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A portable communication device comprising:
a transceiver;
a digital signal processor coupled to the transceiver; and
an electronic processor, coupled to the transceiver and the digital signal processor, and configured to
tune the transceiver from an operating channel to a self-quieting channel;
receive, from the digital signal processor, a received signal strength indication based on a self-quieting signal received via the transceiver;
compare the received signal strength indication for the self-quieting signal to a predetermined reference signal strength indication associated with the self-quieting channel to determine a signal strength difference; and when the signal strength difference exceeds a threshold, generate a component failure alert based on the signal strength difference.

2. The portable communication device of claim 1, further comprising:
a receiver front end,
wherein the electronic processor is further configured to
toggle an operation of a component of the receiver front end;
receive, from the digital signal processor, a second received signal strength indication for the self-quieting signal;
compare the second received signal strength indication for the self-quieting signal to the predetermined reference signal strength indication associated with the self-quieting channel to determine a second signal strength difference; and
when the second signal strength difference exceeds the threshold, generate the component failure alert based further on an identifier of the component.

3. The portable communication device of claim 2, wherein the component of the receiver front end is one selected from the group consisting of a low noise amplifier, a mixer, a filter, an Intermediate Frequency amplifier, and an oscillator.

4. The portable communication device of claim 1, wherein the electronic processor is further configured to
receive, from the digital signal processor, a plurality of received signal strength indications for the self-quieting signal;
calculate an average received signal strength indication for the self-quieting signal based on the plurality of received signal strength indications; and
determine the signal strength difference by comparing the average received signal strength indication to the predetermined reference signal strength indication.

5. The portable communication device of claim 1, wherein the electronic processor is further configured to
when the signal strength difference exceeds the threshold,
determine a failure severity based on the signal strength difference; and
generate the component failure alert based further on the failure severity.

6. The portable communication device of claim 1, wherein the threshold is based on a plurality of predetermined reference signal strength indications for the self-quieting channel.

7. The portable communication device of claim 6, wherein the threshold is based on a standard deviation of the average of the plurality of predetermined reference signal strength indications for the self-quieting channel.

8. The portable communication device of claim 1, wherein the threshold is based on a plurality of predetermined reference signal strength indications from multiple self-quieting signal channels in a redundant system to reduce signal strength indications errors caused by external interference, and other environmental conditions.

9. The portable communication device of claim 1, further comprising:
an antenna coupler;
a radiofrequency detector coupled to the antenna coupler; and
an analog to digital converter coupled to the radiofrequency detector and the digital signal processor;
wherein the electronic processor is further configured to
receive, from the digital signal processor, a voltage standing wave ratio based on a reflected power signal received via the radiofrequency detector and the analog to digital converter;
determine an accuracy rating for the voltage standing wave ratio based on the signal strength difference of the self-quieting channel; and
when the accuracy rating exceeds an error threshold, generate an error condition.

10. The portable communication device of claim 9, further comprising:
a global navigation satellite system;
wherein the electronic processor is further configured to
receive, from the global navigation satellite system, a location for the portable communication device when the reflected power signal is received by the radiofrequency detector; and
store, in a memory, the accuracy rating, the location, and a time when the reflected power signal was received.

11. A method for radio frequency component performance measurement using radiated spurious energy, the method comprising:
tuning a transceiver from an operating channel to a self-quieting channel;
receiving, from a digital signal processor, a received signal strength indication based on a self-quieting signal received via the transceiver;
comparing, with an electronic processor, the received signal strength indication for the self-quieting signal to a predetermined reference signal strength indication associated with the self-quieting channel to determine a signal strength difference; and
generating a component failure alert based on the signal strength difference when the signal strength difference exceeds a threshold.

12. The method of claim 11, further comprising:
receiving, from a global navigation satellite system, a location for a portable communication device when the component failure alert is generated;
receiving a query from a probing device via a network; and
in response to receiving the query, transmitting the component failure alert, the received signal strength indication for the self-quieting signal, the location, and a time when the component failure alert was generated to the probing device via the network.

13. The method of claim 11, further comprising:
toggling the operation of a component of a receiver front end;
receiving, from the digital signal processor, a second received signal strength indication for the self-quieting signal;
comparing, with the electronic processor, the second received signal strength indication for the self-quieting signal to the predetermined reference signal strength indication associated with the self-quieting channel to determine a second signal strength difference; and
generating the component failure alert based further on an identifier of the component when the second signal strength difference exceeds the threshold.

14. The method of claim 13, wherein toggling the operation of the component of the receiver front end includes toggling the operation of one selected from the group consisting of a low noise amplifier, a mixer, a filter, an Intermediate Frequency amplifier, and an oscillator.

15. The method of claim 11, further comprising:
receiving, from the digital signal processor, a plurality of received signal strength indications for the self-quieting signal; and
calculating an average received signal strength indication for the self-quieting signal based on the plurality of received signal strength indications;
wherein determining the signal strength difference includes comparing the average received signal strength indication to the predetermined reference signal strength indication.

16. The method of claim 11, further comprising:
when the signal strength difference exceeds the threshold, determining a failure severity based on the signal strength difference;
wherein generating the component failure alert includes generating the component failure alert based on the failure severity.

17. The method of claim 11, wherein the threshold is based on a plurality of predetermined reference signal strength indications for the self-quieting channel.

18. The method of claim 17, wherein the threshold is based on a standard deviation of the mean of the plurality of predetermined reference signal strength indications for the self-quieting channel.

19. The method of claim 17, wherein the threshold is based on a plurality of predetermined reference signal strength indications from multiple self-quieting signal channels in a redundant system to reduce signal strength indications errors caused by external interference, and other environmental conditions.

20. The method of claim 11, further comprising:
receiving, from the digital signal processor, a voltage standing wave ratio based on a reflected power signal received from an analog to digital converter coupled to the digital signal processor and a radiofrequency detector coupled to an antenna coupler;
determining an accuracy rating for the voltage standing wave ratio based on the signal strength difference for the self-quieting channel; and
generating an error condition when the accuracy rating exceeds an error threshold.

21. The method of claim 20, further comprising:
receiving, from a global navigation satellite system, a location for a portable communication device when the reflected power signal is received; and
storing, in a memory, the accuracy rating, the location, and a time when the reflected power signal was received.

22. A system for measuring performance of an antenna using radiated spurious energy, the system comprising:
a transceiver;
a digital signal processor coupled to the transceiver; and
an electronic processor, coupled to the transceiver and the digital signal processor, and configured to
tune the transceiver from an operating channel to a self-quieting channel;
receive, from the digital signal processor, a received signal strength indication based on a self-quieting signal received via the transceiver;
compare the received signal strength indication for the self-quieting signal to a predetermined reference signal strength indication associated with the self-quieting channel to determine a signal strength difference; and
when the signal strength difference exceeds a threshold, generate an antenna failure alert based on the signal strength difference.

23. The system of claim 22, wherein the electronic processor is further configured to
when the signal strength difference exceeds the threshold, determine a failure severity based on the signal strength difference; and
generate the antenna failure alert based further on the failure severity.

* * * * *